United States Patent [19]

Anderson

[11] 4,030,094
[45] June 14, 1977

[54] DEVICE FOR SELECTING COMPUTER OPERATIONAL MODE AND LABELING INPUT CONTROLS ACCORDINGLY

[75] Inventor: Richard C. Anderson, Los Altos, Calif.

[73] Assignee: Varian Associates, Palo Alto, Calif.

[22] Filed: July 14, 1975

[21] Appl. No.: 595,946

[52] U.S. Cl. .................. 340/365 R; 235/145 R
[51] Int. Cl.² .......................................... G08C 1/00
[58] Field of Search ................ 340/365 R, 347 P; 235/145 R

[56] References Cited

UNITED STATES PATENTS

| | | | |
|---|---|---|---|
| 3,187,321 | 6/1965 | Kameny | 340/365 R |
| 3,394,368 | 7/1968 | Carr | 340/365 R |
| 3,600,592 | 8/1971 | Mahan | 349/365 P |

Primary Examiner—Thomas B. Habecker
Attorney, Agent, or Firm—Stanley Z. Cole; Richard B. Nelson; Robert K. Stoddard

[57] ABSTRACT

The device is a translucent plastic mask or overlay which fits over the keyboard of the computer input/output station to label the keys with their functions according to the selected mode of operation. A projecting portion along one of the edges of the mask extends into a slot adjacent the keyboard where a series of code segments forms an optical code which is read by a corresponding series of lamp and photocell pairs to provide the computer with the information to cause its mode of operation to correspond with the keyboard legends.

2 Claims, 4 Drawing Figures

DEVICE FOR SELECTING COMPUTER OPERATIONAL MODE AND LABELING INPUT CONTROLS ACCORDINGLY

BACKGROUND OF THE INVENTION

Data processing systems often have the capability of performing a potentially bewildering variety of preselected processing operations upon an equally large variety of types of data inputted to the system by a human operator. For example, in a data processing system which is designed to produce a building construction cost estimate from information inputted to the system by a human operator working from architects drawings or blueprints, the system must be capable of (1) accepting quantitative data concerning a vast array of purchased hardware such as plumbing and electrical fittings, (2) accessing its relevant cost data concerning each item of equipment inputted, and (3) producing an accurate total cost for the entire construction project.

Similarly the system operator (or estimator) in dealing with the great variety of different types of data which go into the cost estimate requires a simple means to inform him in human language of the function of each control on the computer input/output station no matter which mode of system operation is in use.

DESCRIPTION OF THE PRIOR ART

U.S. Pat. No. 3,187,321 to Kameny discloses a computer input device having a keyboard utilizing perforated cards which are installed on the keyboard as "overlays". In addition to providing legends to label the switches or keys of the console the overlays include means in the form of plugs 46 for mechanically actuating various ones of switches 48–52 to generate code signals utilized by the computer.

U.S. Pat. No. 3,158,317 to Alexander relates to a similar apparatus in which physically projecting portions on the overlay mechanically actuate switches to cause the computer to initiate various operations relative to the subject matter of each overlay.

U.S. Pat. No. 3,394,368 to T. J. Carr describes a control keyboard containing magazines of several legend-bearing plates which, like the overlays in Alexander and Kameny, label certain switches on the keyboard while at the same time providing mechanical actuation of a series of switches which produce an electrical indication of which magazine is in use.

The above prior art illustrates the use of plates or overlays bearing legends in human language for labeling switches and controls on keyboards. Means are also provided for identifying to a computer, for example, the overlay in use and for initiating the selection by the computer of a particular program or sequence. However, in each case this last means is in the form of projecting portions on the overlay which actuate mechanical switches. Such mechanical means of actuation are prone to a variety of problems such as wear or damage to the projecting portions of the overlay such that the correct switches may not be actuated. Furthermore the requirements for mechanical precision of the switch actuating portions of the overlay and the need for exact positioning of the overlay relative to the switches introduce uncertainty of operation of the correct switches in use.

OBJECTS OF THE INVENTION

It is a principal object of the present invention to provide a simple, reliable and economic means both for labeling the switches on a keyboard in human language and producing an electrical signal to a data processing system to identify the overlay and/or initiate a sequence of operations relative to that overlay.

A further object of the present invention is to provide a keyboard overlay in which the electrical identification to the computer is provided without mechanical actuation of switches.

A further object of the present invention is the provision of a keyboard overlay in which electrical identification of the overlay is provided to the computer by means of an optical code contained in the overlay.

A further object of the present invention is the same as the immediately preceding object wherein the optical code consists in the relative reflectance of selected areas of the mask.

A further object of the present invention is the same as the preceding objects wherein the optical code is contained in the relative transmittance of selected areas of the overlay.

These and other objects, features and advantages of the present invention will become apparent from a reading of the following detailed description of a preferred embodiment of the invention and by studying the drawings.

DETAILED DESCRIPTION OF THE INVENTION

Figure 1:
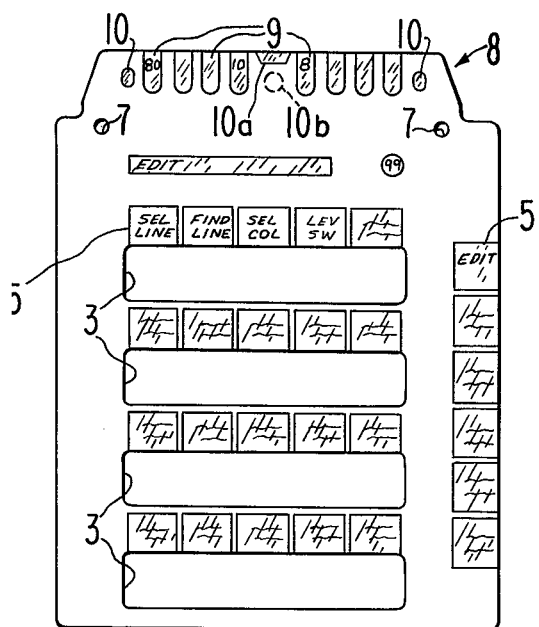
FIGS. 1 and 2 are plan views of alternate embodiments of the keyboard overlay of the present invention.

In FIG. 1, 1 represents a translucent overlay made of, for example, a polyester plastic. A series of keyboard apertures 3 are cut through the overlay 1 such that in use the keys or controls of a keyboard may project through the overlay. A legend 5 is located immediately above each of keyboard apertures 3 in overlay 1 to provide a label for the control projecting through that aperture. Similarly, legends 5 also appear along the right edge of overlay 1 in the drawing in order to label the functions of a row of keys located immediately adjacent the right edge of the overlay when it is in use on the keyboard. A pair of alignment holes 7 are provided to insure proper registration of overlay 1 with the corresponding keyboard in use.

According to the present invention coded information, which may be for the purpose of identifying the particular overlay 1 to the computer, or to initiate a certain sequence of operations in the computer, is provided within a projecting edge portion 8 of overlay 1 in the form of a series of spaced code segments 9. Segments 9 carry information in a digitized or bi-level form according to whether they are, for example, translucent or opaque. In short, the information is carried by a code based on the transmittance of segments 9.

Alternatively, segments 9 could carry the desired information in the form of some other optical property such as reflectance for example. Using this scheme, certain of the segments could have a high reflectance whereas other segments would have a relatively low reflectance. Other alternative schemes of optically encoding the information in segments 9 such as the use of different bandpass characteristics for the segments (chromatic encoding) or polarization characteristics could be used. Also the segments could have a different shape, number or location on overlay 1.

According to the present invention, it is possible to provide an indication to the operator that overlay 1 has been fully inserted in its appropriate location on a reader. Mask alignment segments 10 and 10a are opto-electronically transduced by three photocells. Two of these photocells (not shown) are in alignment with the outer end alignment segments 10 when overlay 1 has been fully inserted. A third photocell is located at the midpoint of an imaginary line between segments 10, as shown by the dotted circle 10b in FIG. 1.

When overlay 1 has been fully inserted in its correct position on a reader or data input/output station, end alignment segments 10, which are translucent, permit a signal indication to be registered in the corresponding photocells. The third photocell (dotted circle) will simultaneously receive no light if the overlay 1 is fully inserted in position, producing a "zero" (no signal) condition in the associated circuitry. The corresponding data circuitry interprets this set of conditions as "overlay fully inserted".

If, however, the overlay 1 is only partially inserted alignment segment 10a will permit a signal indication to be registered in the corresponding third photocell, while end segment 10 will block light from reaching their corresponding photocells. The associated circuitry will interpret this set of signals as indicating "overlay partially inserted" and can react accordingly by warning the operator.

Figure 2:
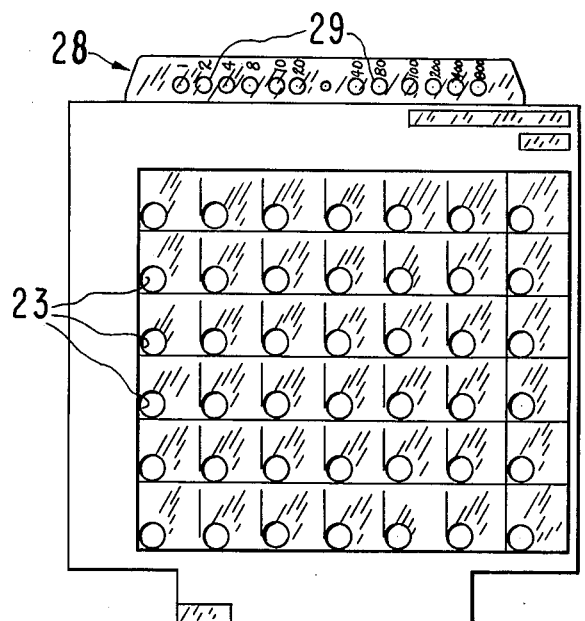

FIG. 2 illustrates an alternative translucent overlay 21 according to the present invention. In the overlay 21 a series of round keyboard apertures 23 are provided to receive correspondingly shaped keys. As in the embodiment of FIG. 1 a legend (not shown) would be printed in the square adjacent each of the keyboard apertures. A series of circular code segments 29 are disposed in a row along a projecting edge portion 28. Information can be encoded in circular code segments 29 by merely punching out various ones of segments 29. The segments 29 which have not been punched may then exhibit a lower transmittance to light than the ones punched in a code system relying on light transmission.

Alternatively, by providing that the translucent overlay have at least one surface of high reflectance, then the circular segments 29 which have been punched out will have a lower reflectance, especially if the overlay is placed over a matte finished backing.

Figure 4:
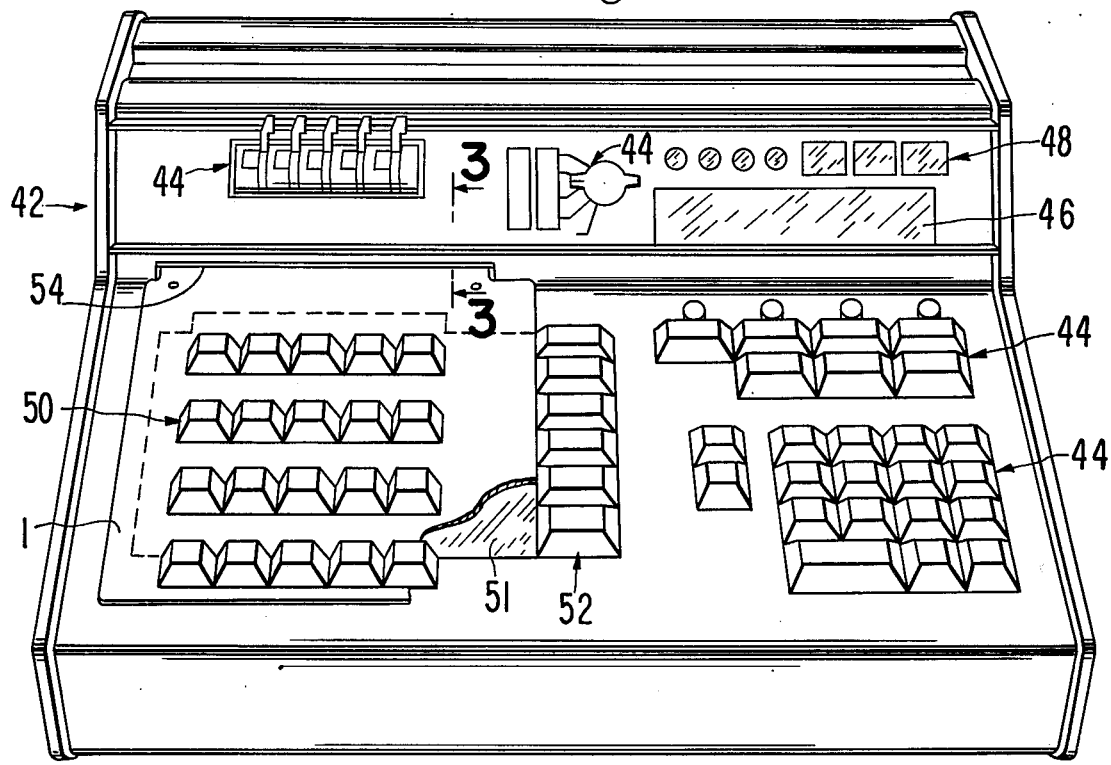
FIG. 4 is an isometric view of the keyboard of a computer control console.

FIG. 4 illustrates one type of computer input/output station in the form of a desk-top console 42. A number of switches and selectors indicated generally by numeral 44 do not concern the present invention and will not be described further. An alphanumeric display 46 provides a visible readout of a quantified output result or, selectably, of data being inputted. A row of lighted indicators 48 provides information concerning the operating conditions of the system.

In accordance with the present invention translucent overlay 1 is placed over an array of selector buttons 50, which then project through keyboard apertures 3 and are labeled by legends 5. Overlay 1 is shown partially cut away revealing a glass panel 51 through which a source of light (not shown) transilluminates overlay 1.

A pair of alignment pins (not shown) extend through alignment holes 7 to correctly orient overlay 1. The legend 5 along the right edge of overlay 1 falls adjacent to and labels a row of function buttons 52. Projecting edge portion 8 of overlay 1 extends into a reader slot 54. Within reader slot 54 a series of lamp-and-photocell pairs are arranged to "read", i.e., opto-electronically transduce the coded information in code segments 9.

Figure 3:
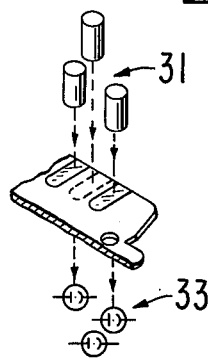
FIG. 3 is an isometric view of a portion of the structure of FIG. 4 taken along the lines 3–3.

In FIG. 3, a cutaway view taken along lines 3—3 in FIG. 4, a portion of one type of lamp-and-photocell reader is illustrated. A series of light sources 31 and photocells 33 are arranged in pairs such that the axis of light transmission for each pair passes through a single one of code segments 9. Thus there would be as many light-source-and-photocell pairs as there are segments 9 to be read.

It is not essential that there be a separate light source for each of the photocells. In many applications, a single source of light, such as an illuminated panel, could provide a common light source for several or even all of the photocells. Alternatively, a single light source could be used as a source of a separate light beam to each of the photocells by a system of planar reflectors or a system of light pipes.

In FIG. 3, three segments 9 are illustrated, the center one being nontransmissive or opaque, the other two being transparent. Any of the known types of photocell, either photovoltaic or photoresistive could be used as photocells 33 to generate an electrical indication representative of the coded information in code segments 9. Also any of the other optical encoding schemes mentioned earlier in the specification could be used. For example, differences in reflectance of the code segments 9 could be used, with the lamp-and-photocell pairs then being located on the same side of overlay 1.

In use overlay 1 thus provides in a simple and relatively automatic fashion a means of telling the data processing system which information or program of operations to access while at the same time telling the human operator by means of the written legends 5, what the selector buttons 50 and function buttons 52 represent within the context of operations produced by the coded information in code segments 9.

Although the invention has been described with some particularity in reference to a preferred embodiment it will be understood that workers skilled in the art may make many changes which fall within the scope of the invention. Therefore it is intended that the scope of the invention be determined only from the following claims.

What is claimed is:

1. In an input/output station for a data processing system, said input/output station having a plurality of manually operable switches, THE IMPROVEMENT COMPRISING a translucent overlay receivable on said input/output station, said overlay including visible legend means for labeling said switches, and means on said overlay for optically encoding information, said input/output station having reader means to opto-electronically transduce said coded message into an electronic signal, said means for optically encoding including means for producing a signal indicative of receipt of said overlay on said input/output station and correct alignment therebetween.

2. The apparatus of claim 1 wherein said means for producing a signal indicative of receipt of said overlay comprises a discrete code segment on said overlay, said segment being so positioned on said overlay as to be in alignment with a corresponding optical transducer on said input/output station only when said overlay is properly positioned on said input/output station, and wherein said code segment comprises an area on said overlay within which an optical property of said overlay differs from adjacent areas on said overlay.

* * * * *